(12) United States Patent
Halstead et al.

(10) Patent No.: US 6,363,392 B1
(45) Date of Patent: Mar. 26, 2002

(54) METHOD AND SYSTEM FOR PROVIDING A WEB-SHARABLE PERSONAL DATABASE

(75) Inventors: Gerald F. Halstead; Dwight C. Aspinwall, both of Lebanon, NH (US)

(73) Assignee: Vicinity Corporation, Palo Alto, CA (US)

(*) Notice: Subject to any disclaimer, the term of this patent is extended or adjusted under 35 U.S.C. 154(b) by 0 days.

(21) Appl. No.: 09/173,983

(22) Filed: Oct. 16, 1998

(51) Int. Cl.[7] .............................................. G06F 17/30
(52) U.S. Cl. ..................... 707/102; 707/104; 709/206
(58) Field of Search ...................... 707/1–5, 10, 100, 707/102, 104; 709/206, 207; 340/988–996; 701/207, 208, 213

(56) References Cited

U.S. PATENT DOCUMENTS

| | | | | |
|---|---|---|---|---|
| 5,751,961 A | * | 5/1998 | Smyk ..................... | 395/200.47 |
| 5,802,492 A | * | 9/1998 | De Lorme et al. .......... | 455/456 |
| 5,859,978 A | * | 1/1999 | Sonderegger et al. .. | 395/200.56 |
| 5,901,214 A | * | 5/1999 | Shaffer et al. .............. | 379/220 |
| 5,944,787 A | * | 8/1999 | Zoken ......................... | 709/206 |
| 5,946,687 A | * | 8/1999 | Gehani et al. ................. | 707/10 |
| 5,948,061 A | * | 9/1999 | Merriman et al. ........... | 709/129 |
| 5,953,722 A | * | 9/1999 | Lampert et al. ............. | 707/100 |
| 6,067,623 A | * | 5/2000 | Blakley, III et al. ......... | 713/201 |

OTHER PUBLICATIONS http://www.planetall.com/registration/help/agrehelp.asp, *Planet All Help* Jun. 29, 1998, pp. (10).

* cited by examiner

*Primary Examiner*—Maria N. Von Buhr
(74) *Attorney, Agent, or Firm*—Blakely, Sokoloff, Taylor & Zafman LLP

(57) ABSTRACT

A method and system for providing a flexible, web-sharable database with proximity searching capability. A processor receives data from a remote source. A database manager assembles the data into a database dynamically conforming to the form of the data received. An address extraction extracts addressing information from the data received and supplies the addressing information to a geocoder. The geocoder generates a geocode corresponding to the addressing information and associates the geocode with the addressing information.

17 Claims, 15 Drawing Sheets

A word about Passwords

There are two passwords involved with your DataBase: an EDIT Password and a VIEW Password. The EDIT Password is your secret password allowing you to modify your data. The VIEW Password (optional) allows or restricts others from viewing your data. The VIEW Password never allows access to editing your records.

Both your name and password should be at least two character long Login and passwords can only contain a-z, A-Z, and 0-9.

In the event you lose your Edit Password we will use your "Special Date" for verification and your email address to send you a new Edit Password. Your email is not used for any other purpose.

Create New DataBase

LOGIN NAME [          ]

EDIT PASSWORD [          ]

EDIT PASSWORD again [          ]

Your EMAIL ADDRESS [          ]
*used for account verification*

SPECIAL DATE [ -- ▶] [  ], 19[  ]
*if you forget your password, we'll know you by your special date (eg. birthday - nobody forgets that)*

TYPE of DataBase [ Address Book ▶]
*If you have data to upload, then you don't need to select anything* your EDIT PASSWORD CODE [     ]
*used to allow/disallow others from viewing your data*

[ Reset this form ]    [ Register now! ]

FIG. 3

Sample DataBase

Record Add

First Name
Last Name
Company
Street
City
State
Zip
Country
Phone
Fax
E-mail
Web Page Address to use for map ○ Business ○ Home ○ Other ● None (no map)

[ Complete ]

To see pictures use this format:

Tips

Graphics

Account
sample
Show Records
Import File
Export File
Import YP
Records
Customize
Log Out
Change Login
Text to find Try your
DataBase

FIG. 4

Sample DataBase

[ Field Names & Sorting | Page Layout | Change Passwords | Summary Fields ]

If you are going to upload data, then do that FIRST and then come back to customize.
Uploading a file changes the field names (deleting any that are already set)

NOTE: if you want your data to have a map associated with it then be sure
that you have address fields containing the following supported names or Lat/Lon fields.

| street<br>address<br>address1 | city<br>town | state<br>province | country | zip<br>zip code<br>postal code | lat<br>lon<br>latitude<br>longitude |
|---|---|---|---|---|---|

Field Names

| | | Default<br>Sort Field |
|---|---|---|
| Field 1 | First Name | ● |
| Field 2 | Last Name | ○ |
| Field 3 | Company | ○ |
| Field 4 | Street | ○ |
| Field 5 | City | ○ |
| Field 6 | State | ○ |
| Field 7 | Zip | ○ |
| Field 8 | Country | ○ |
| Field 9 | Phone | ○ |
| Field 10 | Fax | ○ |
| Field 11 | E-mail | ○ |
| Field 12 | Web Page | ○ |

[Add Field]   [Complete]

Account
sample
Show Records
Import File
Export File
Import YP
Records
Customize
Log Out
Change Login
Text to find
[          ]
Try your
DataBase

FIG. 5

Sample's DataBase

| First Name | Joe |
|---|---|
| Last Name | Smith |
| Company | XYZ, Inc. |
| Street | 3776 Via Dolce |
| City | Marina Del Rey |
| State | CA |
| Zip | 90292 |
| Phone | 555-1234 |
| E-mail | jsmith@xyz.com |

MapBlast! to nearby services and directions.

Account
sample
Add Rcord
Show Records
Edit This
Delete This
Import File
Export File
Import YP Records
Customize
Log Out
Change Login
Text to find Try your DataBase

FIG. 6

We'll turn non-graphic urls into hotlinks:

Web page Links http://www.your_site.com/index.html
http://www.your_site.com/cgi-bin/welcome

We'll turn email addresses into hotlinks:

Email Addresses jerry@vicinity.com
Personal: me@mydomain.com Work: suit@corporate.com

FIG. 6(1)

Sample DataBase

Only show records in sort field that start with:
-A-B-C-D-E-F-G-H-I-J-K-L-M-N-O-P-Q-R-S-T-U-V-W-X-Y-Z-1-2-3-4-5-6-7-8-9

| | A-Z | First Name | Last Name | Company | Street | City | Detail | Edit | Delete | Map type |
|---|---|---|---|---|---|---|---|---|---|---|
| 1 | | Joe | Smith | XYZ, Inc. | 3776 Via Dolce | Marina Del Rey | ? | ✎ | 🗑 | Good |

✉ - Email   N - Web Page

FIG. 8

Account
sample
Add Rcord
Show Records
Import File
Export File
Import YP
Records
Customize
Log Out
Change Login
Text to find Try your
DataBase

*There are two ways to view your data.*
[ Search Near a Location | <u>Search All Records</u> | <u>Show All Records</u> ]

SEARCH NEAR LOCATION

Street Address ☐

City, State, Zip ☐ | USA ▼ |
*[Country]*

*Options*

Miles to Search ☐

Text to Find ☐

Results Layout ● Normal
○ Calendar
○ PalmPilot

Show Map ☐ Map
*(if applicable)*

Records per page | 10 ▼ |

[ Show Records ]

Note: if you search near an address you won't see records which don't have a map associated with them.

View Data

<u>Change DataBase</u>
<u>New Search</u>
<u>Edit/Make your own DataBase</u>

FIG. 9

Sample DataBase

Enter a type of business, business name, or SIC code

Find: [By Name ▶] [                    ]

Records to get [10 ▶]

[            ] Street
[            ] City, State

Country [USA ▶]

[ Search ]

Account
sample
Add Rcord
Show Records
Import File
Export File
Import YP
Records
Customize
Log Out
Change Login
Text to find
[            ]
Try your
DataBase

FIG. 10

(Searching from Washington Blvd, Marina Del Rey, CA 90292-5123)

Enter a type of business, business name, or SIC code

Find: [By Type ▶] [Restaurant]

Records to get [10 ▶]

Street [Washington Blvd]

City, State [Marina Del Rey, CA]

Country [USA ▶]   [Search]

That search Type produced the following categories

[Search Checked Categories]

| | |
|---|---|
| ☐ - Restaurant equipment & supplies nee | ☐ - Restaurants |
| ☐ - Restaurant ethnic food | ☐ - American restaurants |
| ☐ - Chinese restaurants | ☐ - French restaurants |
| ☐ - German restaurant | ☐ - Greek restaurants |
| ☐ - Indian & Pakistan restaurants | ☐ - Italian restaurants |
| ☐ - Japanese restaurants | ☐ - Korean restaurants |
| ☐ - Mexican restaurants | ☐ - Spanish restaurants |
| ☐ - Thai restaurants | ☐ - Vietnamese restaurants |
| ☐ - Fast food restaurants & stands | ☐ - Pizza restaurants |
| ☐ - Seafood restaurants | ☐ - Steak & barbecue restaurants |
| ☐ - Barbecue restaurants | ☐ - Steak restaurants |
| ☐ - Health food restaurants | ☐ - Restaurant equipment repairs |
| ☐ - Restaurant management services | |

[Search Checked Categories]

Account
sample
Add Rcord
Show Records
Import File
Export File
Import YP
Records
Customize
Log Out
Change Login
Text to find [    ]
Try your
DataBase

FIG. 11

(Searching from Washington Blvd, Marina Del Rey, CA 90292-5123)
Enter a type of business, business name, or SIC code

Find: By SIC ▶ M5812
Records to get  10 ▶
Street  Washington Blvd
City, State  Marina Del Rey, CA
Country  USA ▶   Search

| Name | Address | City | State | Zip | Phone | Distance | Import |
|---|---|---|---|---|---|---|---|
| El Tarasco | 109 Washington Blvd | Venice | CA | 90292-5125 | 310-306-8552 | 462 feet | ☒ |
| Baja Cantina | 311 Washington Blvd | Marina Del Rey | CA | 90292-5129 | 310-821-2252 | 884 feet | ☒ |
| Siamese Garden | 301 Washington Blvd | Venice | CA | 90292-5129 | 310-821-0098 | 884 feet | ☒ |
| Endless Summer | 300 Washington Blvd | Marina Del Rey | CA | 90292-5130 | 310-821-3577 | 907 feet | ☒ |
| Islands | 404 Washington Blvd | Marina Del Rey | CA | 90292-5214 | 310-822-3939 | 0.24 miles | ☒ |
| Kifune Restaurant | 405 Washington Blvd | Venice | CA | 90292-5214 | 310-822-1595 | 0.24 miles | ☒ |
| Kifune Sushi Bar | 405 Washington Blvd | Venice | CA | 90292-5213 | 310-822-1595 | 0.24 miles | ☒ |
| Numero Uno Pizza | 425 Washington Blvd | Venice | CA | 90292-5213 | 310-823-8798 | 0.27 miles | ☒ |
| Doubletree Hotel Marina Del Rey | 4100 Admiralty Way | Marina Del Rey | CA | 90292-6207 | 310-301-3000 | 0.42 miles | ☒ |
| Stones | 4100 Admiralty Way | Marina Del Rey | CA | 90292-6207 | 310-301-6868 | 0.42 miles | ☒ |
| | | | | Import | | | |

● Overwrite Old   ○ Append

Account
sample
Add Rcord
Show Records
Import File
Export File
Import YP
Records
Customize
Log Out
Change Login
Text to find Try your
DataBase

METHOD AND SYSTEM FOR PROVIDING A WEB-SHARABLE PERSONAL DATABASE

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

(1) Field of the Invention

The invention relates to sharable web-based databases. More specifically, the invention relates to creation and use of spatially-related user-created databases sharable over the web.

(2) Background

For some time, large companies with extensive resources have been able to create and maintain web-based databases which can then be accessed by users over the Internet. These databases have traditionally been quite expensive and have involved significant overhead to maintain.

More recently, some inroads have been made to permit individual users to create web sharable databases for certain information, such as address books. For example, Planetall, located on the web at planetall.com permits a user to maintain a private address book on the web. Planetall then provides a service of updating the address book based on changes in member information and plans to soon provide updates based on U.S. postal change of address filings. Its general purpose is to permit networking opportunities to its membership. Unfortunately, databases such as these are severely limited in the type and format of data that can be entered, as well as how the data may be manipulated and displayed. Moreover, no provision is provided for spatially relating the uploaded data. In other words, it is difficult to spatially relate the information that is stored in entries in these databases.

In view of the foregoing, it would be desirable to be able to provide a flexible web base database at low cost and the possibility of geographical interrelation amongst that database entries.

SUMMARY OF THE INVENTION

A method and system for providing a flexible, web-sharable database with proximity searching capability is disclosed. In one embodiment, such a system includes a database manager, a spatial indexer, and a storage unit. The database manager receives unformatted data from an interconnected network (e.g., the World Wide Web) and process the unformatted data into a series of records for the database. The spatial indexer recognizes address information in the data and generate spatial indices for records based on the addressing information to associate a geographic location with each of the records. The storage unit stores the data with the spatial indices in a form accessible over the interconnected network that permits spatial searching.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 is one embodiment of a template that is sent to a user when creating a new personal database.

FIG. 4 illustrates an exemplary template for adding a record manually to the personal database.

FIG. 5 illustrates an exemplary template for customizing the personal database.

FIG. 6 illustrates a short form display of a personal database named "Sample" having only a single entry.

FIG. 8 illustrates a display that permits corrective action to be taken if the initial geocoding mispositions the icon.

FIG. 9 illustrates an exemplary template for searching the personal database.

FIG. 10 illustrates an exemplary template for use in initiating a search of a database that has yellow page entries.

FIG. 11 illustrates an exemplary template for use in narrowing a search of a database that has yellow page entries.

FIG. 12 illustrates search results for a restaurant category search.

DETAILED DESCRIPTION OF THE PRESENT INVENTION

Figure 1:
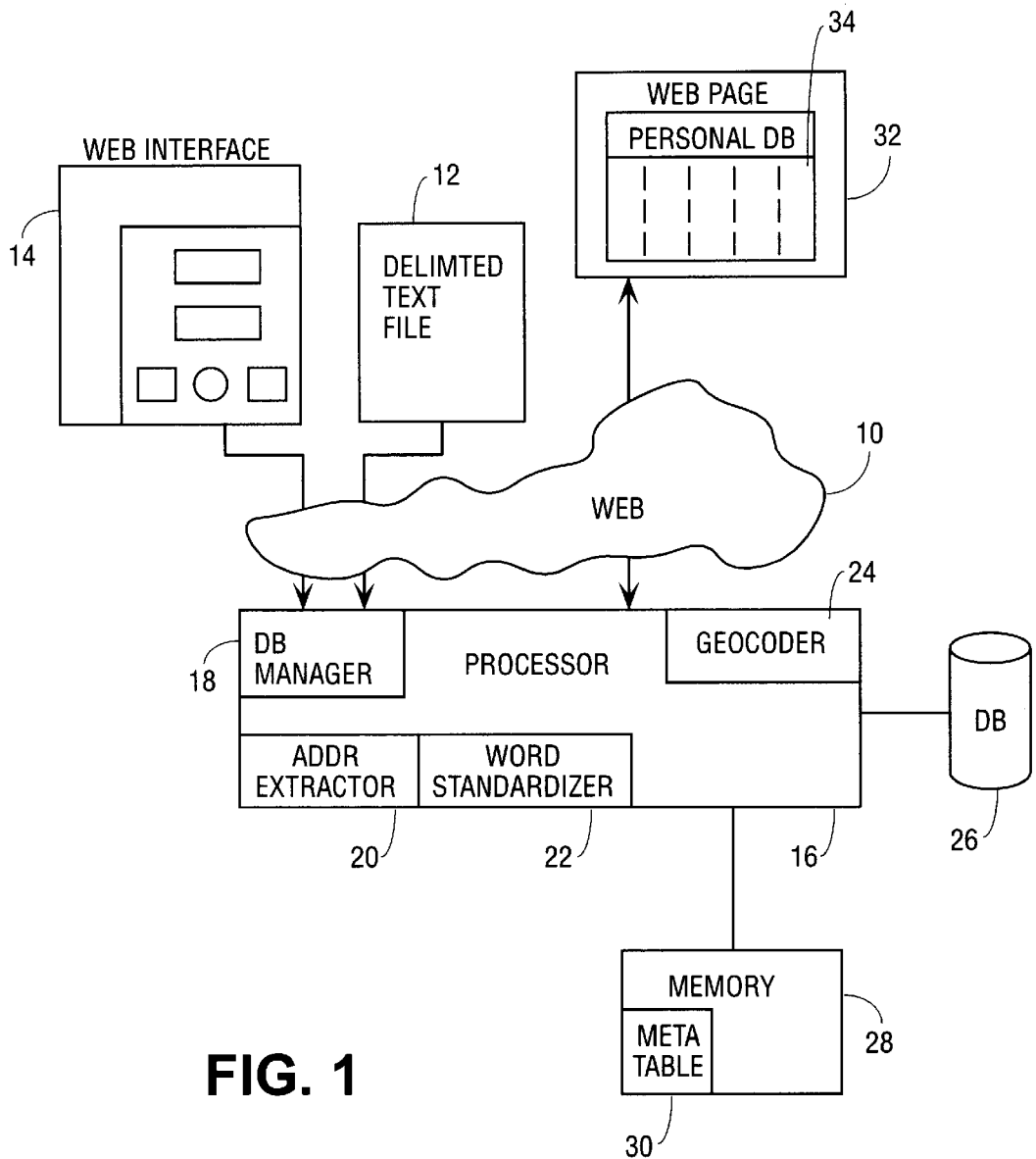
FIG. 1 is a block diagram of one embodiment of a system.

A method and system for providing a sharable database is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating"

or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview

A method and system for providing a flexible, sharable database with proximity searching capability is disclosed. In one embodiment, such a system includes a database manager, a spatial indexer, and a storage unit. The database manager receives unformatted data from a memory, database, an interconnected network of document resources (e.g., the Internet, the World Wide Web, etc.), etc. and processes the unformatted data into a series of records for the database. The database manager adapts to the schema of the data. That is, the database manager is able to receive data in any format from an interconnected network such as the Web and place it into a database. That data may be in, for example, row/column format, ASCII row/column format, deliminated ASCII, etc.

The spatial indexer recognizes address information in the data and generate spatial indices for records based on the addressing information to associate a geographic location with each of the records. In one embodiment, the spatial indexer includes an address extractor and a geocoder. The address extractor extracts the address information from the data, and the geocoder geocodes the addressing information.

The storage unit stores the data with the spatial indices in a form that permits spatial searching. The database is also accessible over an interconnected network of document resources. Thus, the database may be accessed from an Web In one embodiment, the database manager may include a map generator to associate a map with a location associated with a selected record in the database. The map generator is responsive to an individual repositioning the location of the map by updating the spatial index for the selected record in response to an individual repositioning the location on the map.

FIG. 1 is a block diagram of one embodiment of a system. Referring to FIG. 1, processor 16 is shown coupled to a web interface 14, a delimited text file 12, a web page display 32, a database 26, and a memory 28. Processor 16 may comprise more than one processing device and executes instructions stored in a memory such as memory 28 or another memory (not shown). Processor 16 executes instructions to provide the functionality of a database manager 18, an address extractor 20, and a geocoder 24. In an alternate embodiment, each of these functional units may be separate units.

Processor 16 employs a database manager 18 to create web sharable databases for remote users. The database manager 18 may accept a delimited text file 12 or individual hand-entered records entered via web interface 14, either of which may be routed over web 10 to a database manager 18. In one embodiment, data may come from a pre-existing database. In response to a remote user request (i.e., a user request from a remote location), database manager 18 creates a metadata which is associated with the personal database name. The metadata may contain any subsequent customization requested by the user, including layout, record names, graphic source paths, background color, etc. The metadata is stored in a metatable 30 in a memory 28. Memory 28 may be part of database 26.

During creation of a personal shareable database, previously generated records may arrive from a file stored in memory or accessible from memory (e.g., a database, etc.). In one embodiment, the file comprises a delimited text file. Other types of files may be accessed or used to provide data and/or records for inclusion in a personal shareable database. Records and/or data may be entered directly into the system by an individual. In one embodiment, information is entered using a web interface.

The database manager 18 identifies the type of delimitation, for instance, whether it be tab delimited, comma delimited, or other, and then forwards each record to the address extractor 20 to create a new record in database 26. The new record has the same fields to retain all the information in the incoming record. Address extractor 20 views the record to determine if an address or partial address is present.

In one embodiment, the first record of an imported file is required to contain headings. These headings may be column headings, row headings, or any field markers to allow identification of the data in each record. An address extractor 20 parses that first record, looking for particulars identifying words such as, for example, "city," "state," "zip," "address," and/or assorted other such words. By operating with the knowledge that the first record contains the heading, this initial record does not have to be ordered in any particular way. Rather, it only relies on a selection of column headings from a group of likely known words. If such words are found as headings, the address extractor 20 then presumes corresponding information will appear as corresponding fields for the other imported records. In this way, an address or partial address may be extracted.

The address or partial address is then forwarded to geocoder 24 which performs geocoding on the address. In this manner, the data appearing in the personal database will appear as it did in the imported file. The corresponding geocode is added into a field of the corresponding record of the database 26. Based on the geocode, a map may be associated with that record.

Once the database has been created, a user request may be received to view the database. In response to the user request, the database manager 18 locates the name of the database in metatable 30. Based on the preferences in the metadata corresponding to the name, database manager 18 formats the database 26 for viewing on a web page 32. Notably, the viewer of the personal database display 34 on web page 32 need not be, but may be, the original creator of the database.

Figure 2:
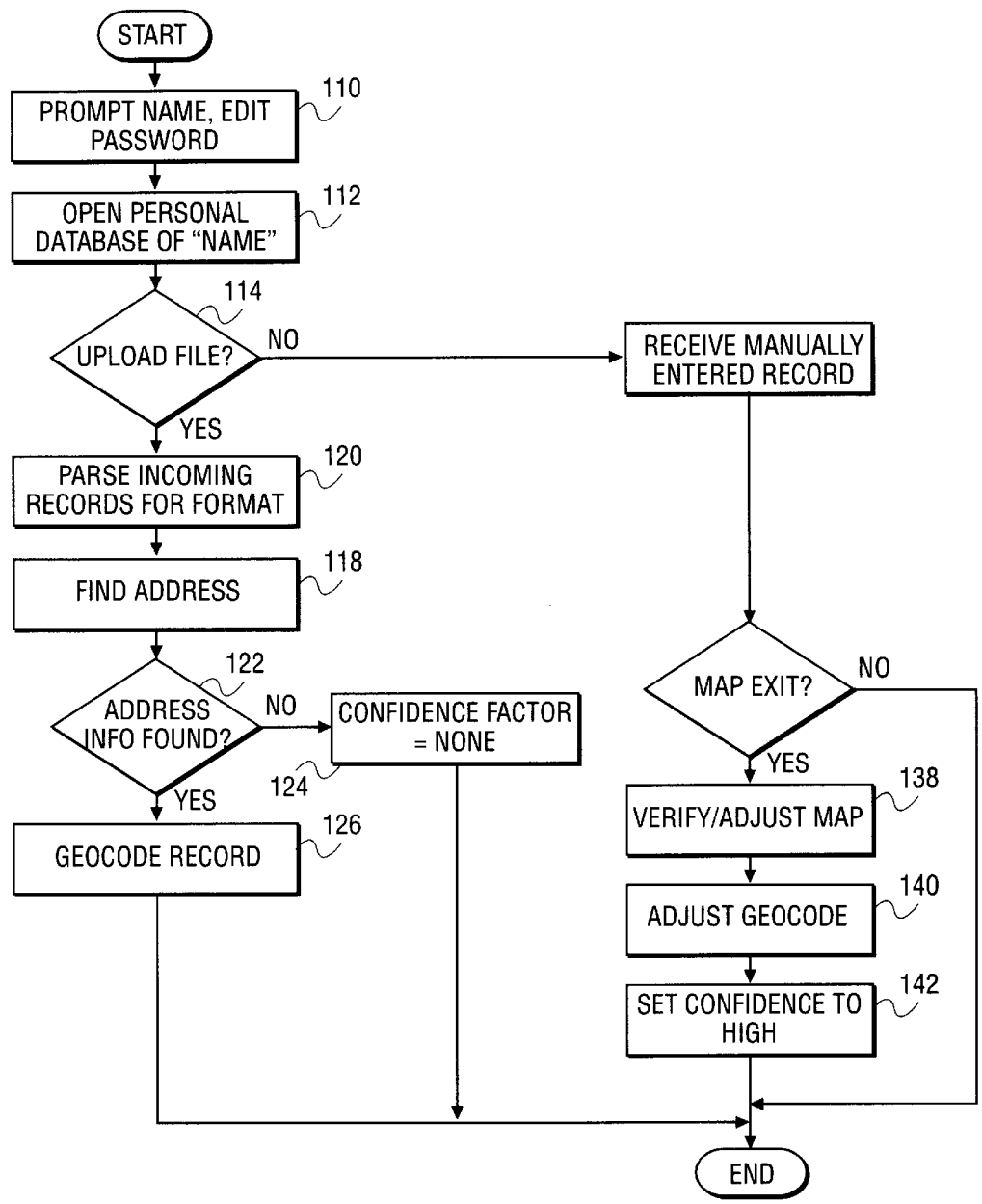
FIG. 2 is a flow chart of one embodiment of a process for editing a personal database.

FIG. 2 is a flow chart of one embodiment of the process for editing a personal database. The process is performed by processing logic. The processing logic may comprise software running on general purpose or dedicated computer system or machine, or may comprise dedicated hardware, or a combination of both.

The process of FIG. 2 occurs after a personal database site has been entered. Upon entering the personal database site, processing logic prompts the user for a name and a password (processing logic 110). It is envisioned that one embodiment of the system will have two passwords-one for editing and one for viewing. The editing password may also permit viewing, though the converse may not be not true. Thus, if the password received is an edit password, processing logic opens the personal database of that name (processing block 112).

At processing block 114, processing logic tests whether a file is to be uploaded or if records will be entered manually. If the file is uploaded at processing block 114, processing logic parses the incoming records for addressing information to determine the format and identifies addressing information (processing block 120).

Regardless of the source of the record, processing logic performs address extraction (processing block 118). Because manually entered records are entered in a template supplied by database manager 18, in which fields are already named, address extraction is simplified. Processing logic tests whether an address has been found (processing block 122). If no address is found or if the purported address is not recognized, processing logic sets a confidence factor to "none", or some other identifier/marker indicating that no address could be found (processing block 124) and then the process ends. If an address or partial address is found, processing logic creates a geocode for the record (processing block 126), creates a map with the record and establishes a confidence factor for the geocode (processing block 126). Then the process ends.

If there is no file uploaded to memory block 114, processing logic receives the manually entered record (processing block 116). Then, processing logic determines if a map exists that is associated with the record (processing block 136). If it is, processing logic (optionally) gives the user the opportunity to verify and adjust the location on the map indicated by the geocode at (processing block 138). A graphical interface may be provided to allow the user to, for example, drag the icon indicating the point identified by the original geocoding to a correct location on the map. Based on this drag of the icon to a new location, processing logic adjusts the geocode associated with the record (processing block 140). Processing logic then sets a confidence factor high (processing block 142).

FIGS. 3–12 show various templates and displays that a user may receive from the database manager in a system of one embodiment of a system. FIG. 3 is a template that might be sent to a user by processing logic in response to a request to create a new personal database. The template permits the user to enter a log-in name which becomes the name of the personal database. It also requests an edit password and that the edit password be verified. An e-mail address is requested for account verification. An edit password code, or more accurately, a view password, is requested. A special date may be used, such as a birthdate, so that the user may reauthenticate themselves in the event that their password has been forgotten.

The user may then select the type of personal database they want. For example, an address book is one option that might be selected. In the event that the user intends to upload a file, there is no need to select a type of personal database since the personal database will automatically take on the form of the data uploaded. Stated differently, the personal database will have a field corresponding to each field of the uploaded data and the fields will have the same names as the uploaded fields had. The makes the personal database very flexible as it is not limited to any particular data type or format. Rather, the personal database system dynamically generates a data structure conforming to the data received.

Figure 7:
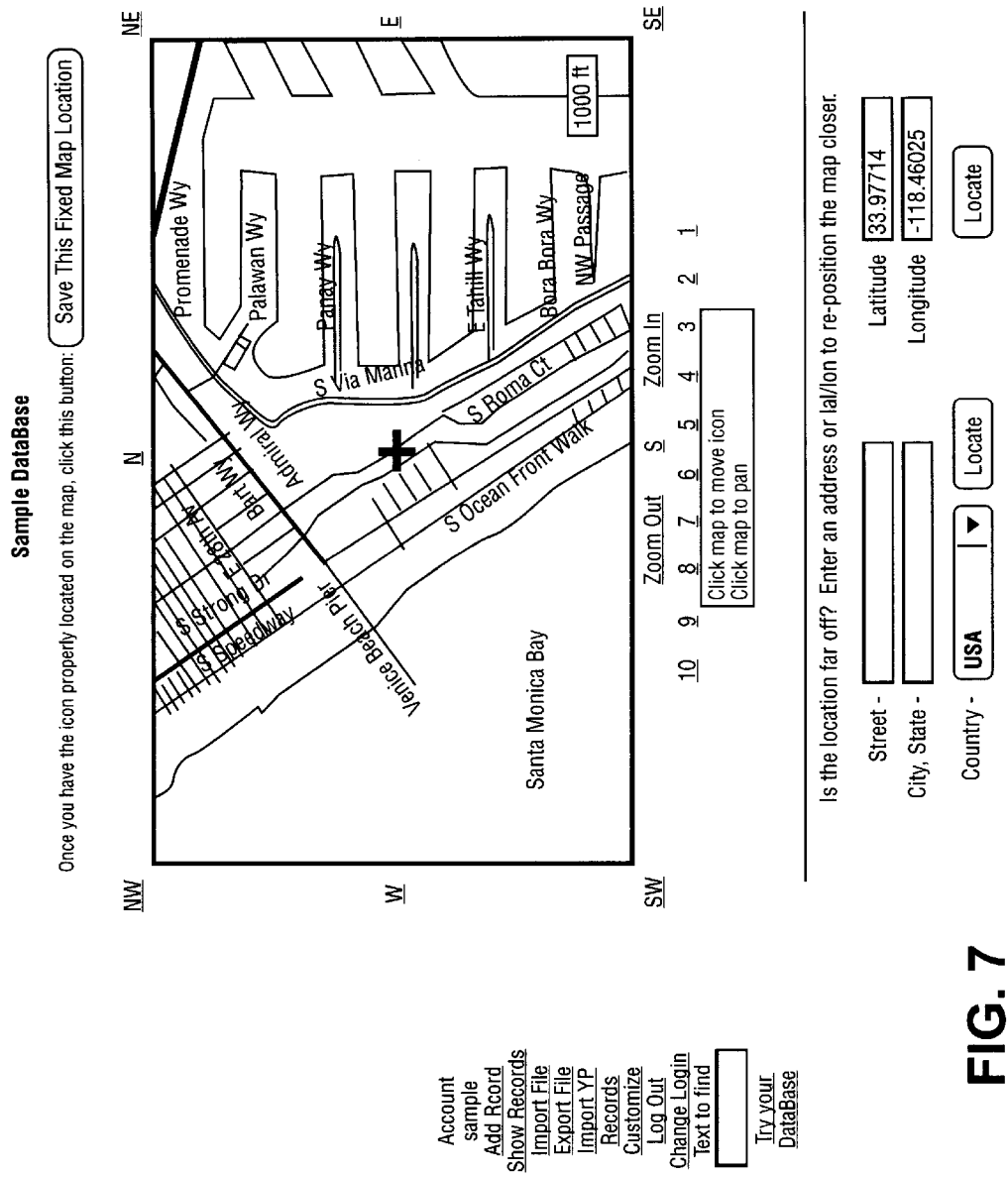
FIG. 7 illustrates a display of the full record for the entry of FIG. 6, including an associated map.

FIG. 4 shows a template that might be returned by processing logic in response to a request to add a record manually to the personal database. In this case, an address book type personal database was selected. The user may select the customize option to add additional fields or to rename or reorder the fields. FIG. 5 shows a template returned in response to customize command. FIG. 6 shows a short form display of a personal database named "Sample" having only a single entry. FIG. 7 shows the full record for the entry of FIG. 6, including the associated map. The e-mail address is automatically converted into a hyperlink. Moreover, empty fields are not displayed. A user may reposition the icon on the map and cause a new geocode to be generated. Thus, if the initial geocoding mispositions the icon, the system permits corrective action to be taken. This is shown in FIG. 8. FIG. 9 shows a template that may be returned to a user when a search of the personal database is requested. It permits entry of an address and a search radius and allows alternative layout formats to be selected for the results of the search.

In one embodiment, it is also possible to search the electronic yellow pages and import records from the yellow pages or other similar database (e.g., another personal database) into a personal database. FIG. 10 shows a template returned to initiate such a search. FIG. 11 shows a template returned in order to narrow the search, and FIG. 12 shows results of the search where the checked category was "restaurants."

Spatial Indexing

The database of the present invention is spatially enabled. There are a number of spatial indexing methods that may be used to geographically identify a described or addressed location. In other words, there are numerous ways to convert coordinates, such as, for instance, latitude and longitude into a geographic coding that may be used for indexing into a database. One embodiment of a spatial indexing method is given below.

One form of spatial indexing involves using quad keys. The process for generating quad keys begins with geocoding where a description of a geographic location is converted into a longitude and latitude. Note that other forms of geocoding may be used, such as those which convert such a description into a different set of one or more coordinates. The longitude and latitude values generated from geocoding may be converted into a quad key. In a computer mapping application, coordinates are represented as integers of some resolution. For example, these may be 16-bit unsigned integers. If the integers of coordinates, such as coordinate x and coordinate y, are expressed in binary form, with the bits interleaved (most significant bit (MSB) from x, followed by MSB from y, followed by next-MSB from x, next-MSB from y, etc.), then the relationship between coordinates and quad keys is illuminated and a base-4 quad key emerges.

The MSB from x divides the spatial domain (root quad) in half along the x axis. The MSB from y does the same along the y axis. The four possible combinations map onto the four quadrants mentioned above. The next two interleaved bits from x and y, in identical fashion, subdivide the quad defined by the previous bits, and so on, until the last bits are interleaved, yielding a quad key of maximal precision given the resolution of the source coordinates. This full resolution quad key is also referred to herein as a point key in recognition of the fact that it can be mapped back to the source coordinates with greater precision than a quad key of lesser resolution.

Figures 13, 14:
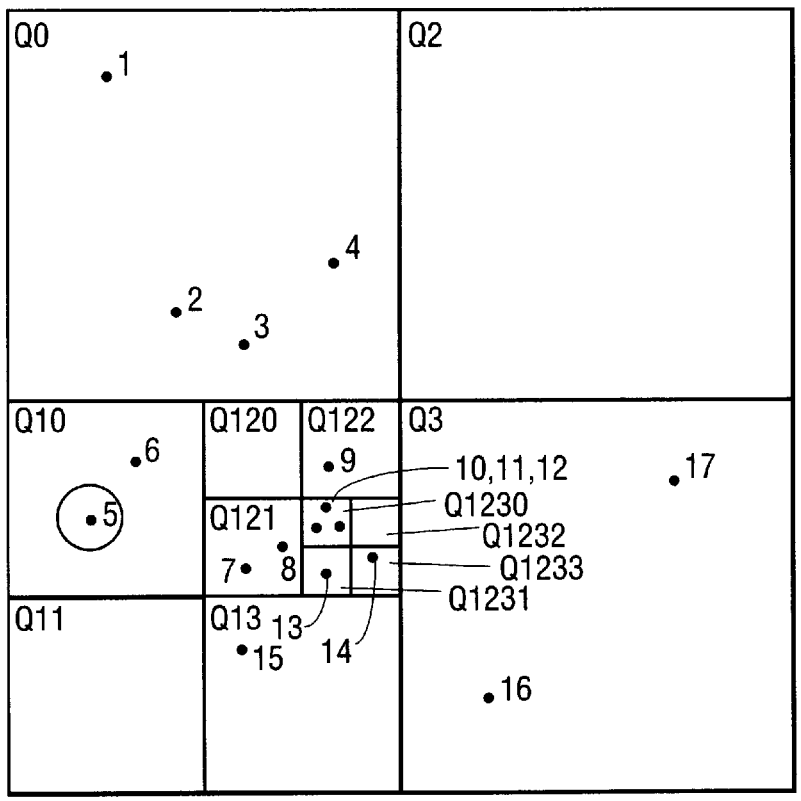
FIG. 13 illustrates one exemplary derivation of a point.
FIG. 14 illustrates a quadtree with a split threshold of four.

FIG. 13 shows one technique for deriving a point key. For a particular point, a longitude and latitude exists. By placing the relevant area within a square having x and y coordinates, the longitude and latitude can be converted into coordinates in x and y. In this instance, the x and y coordinates can each be represented by a 16-bit binary value. In this exemplary case, x=7,000 and y=42,000. Taking the binary representation of each coordinate and interleaving those binary values yields a 32-bit binary value, shown as I in FIG. 13. A key, or quad key in this case, is q followed by a conversion of adjacent pairs of bits in the interleaved value to decimal. That is, the pairs of bits grouped from left to right in the interleaved binary values are converted to decimal. Thus, in the exemplary case, the quad key is Q1012212202032000.

Using a language like C which permits bit manipulation, it is an easy and efficient matter to compute a point key. Depending on the implementation, this may be stored as a binary value or in ASCII form.

The former is compact, while the latter allows the application to take advantage of efficient structured query language (SQL) searching methods in Relational Database Management Systems (RDBMS).

Use of this tiling space method is not restricted to base-2 interleaving. Coordinates represented as base-3 numbers can be used to generate base-9 keys, base-4 to base-16, etc. It should also be noted that other techniques for generating a key or other location indication instead of the point key may be used.

Once generated, the point key is included in the index, along with the other indexed terms and metatags, to permit searching.

Even having the set of point keys, efficient retrieval of two or three dimensional information, such as features on a map from a one dimensionally indexed storage medium, such as a relational database, requires that a one-dimensional "spatial index" be constructed which attempts to cluster contiguous spatial features (e.g., points) together.

Quadtrees are one way of indexing spatial data. FIG. 14 illustrates a quadtree with a split threshold of four. The split threshold is the maximum number of points which are allowed to share a common quad key. Thus, if for a particular quad there are more than four points within that quad (assuming a split threshold of four), then the quad is subdivided into four smaller quads.

To generate a quadtree, the number of points which fall within the entire spatial domain, referred to herein as the "root" of the quadtree, are counted. If there are more than the split threshold, the space is divided into quarters, or "quads." These quads are then examined recursively splitting the quads which exceed the split threshold into four quads, until no quad contains more than the threshold or the depth limit of the tree is reached. The depth limit is the maximum length of the quad key as predefined for the application or system. The split threshold in this example is arbitrarily set to four to make the diagram simple. It can be any value in practice (e.g., 2, 3, 5, 6, etc.).

A simple addressing scheme is used to identify the value of a given quad. Given that the root quad is arbitrarily assigned the value "Q." each child quad's value takes on the parent's value, with an extra suffix in the range 0.3 based on its position in the quadrant. Here, 0 corresponds to an upper left, 1 to a lower left, 2 to an upper right, and 3 to a lower right quadrant, respectively.

The depth of a quad within the tree is implicit in the length of the quad key itself. The longer the quad key, the deeper in the tree the quad address by the quad key is and thus the smaller the area the quad key covers. In practice, most data (such as the distribution of businesses in a country) are not evenly distributed across space. They are concentrated in cities and sparse in between. Thus, the quad key associated with a business in Manhattan will be longer (and cover less space) than the quad key associated with a business in Death Valley. This fact is important to the efficiency of algorithms which perform spatial searching for the nearest features to a point.

It is desirable to restrict the length (which is equivalent to a real extent) of quad keys to a specified range. For example, storage or efficiency considerations in a RDBMS may force a restriction on the maximum or minimum length of an emitted quad key. This can be supported by a minor variation on the concept described above. To enforce the minimum quad key length requirement, a parent key is split if (i) the threshold is exceeded or (ii) there is at least one point and the parent's quad key length is less than the minimum. To enforce the maximum quad key length requirement, a quad key beyond the stated maximum quad key length (the depth limit) is not split. This may mean that a given quad key is mapped onto more than a "threshold" number of points. Even arbitrarily deep quadtrees have little benefit when a large number of points are identical.

Since the goal is efficient quadtree construction where a quadtree is defined to be a list or table of all quad keys for a given set of points, the input points are read in non-decreasing order of point key value. The result of this scan is a depth-first traversal of the quadtree. The order that the points in FIG. 13 are read is shown by the number next to each point. The process uses an array of structures of the form:

```
struct Node
{
    long nChildPoints[4];
    boolean hasSplitDescendant[4];
}
Node nodeArray[16];
```

The node array contains "depth" elements of type Node, where "depth" is the depth of the quadtree (in this example 16). These nodes represent the state of the quadtree along the path defined by the currently examined point key. The integer array nChildPoints contains the number of points occupying the four subquads within this quad. The sum of these values yields the total number of points in the parent quad. The variable nChildPoints is initialized to zero for all Nodes in the node array.

The entry in boolean array hasSplitDescendant will be set to TRUE for any subquads which have been split or have a descendant (child, grandchild, etc.) which has been split. A split quad means that its populated child subquads (those with 1 or more points in them) have been written. This information is maintained to avoid writing quads which are ancestors (higher in the tree) of already emitted quads. Thus, in one embodiment, written quads never overlap in space. If a quad is represented as an ASCII string of form Q010202231. . . , for example, this also means that written quads are never substrings of any other quad, since this is what it means to have an ancestor/descendant relationship. The boolean variable hasSplitDescendant is initialized to FALSE for all Nodes in the node array.

The input is scanned one point key at a time. The scanning process is performed by processing logic. The processing logic may comprise software running on general purpose or dedicated computer system or machine, or may comprise dedicated hardware, or a combination of both. The currently examined point key is referred to herein as thisKey and the previously examined point key is referred to herein as lastKey. The first time through the loop, processing logic sets, or initializes, the variable lastKey to thisKey. Processing logic uses a function GetQuadrant(quad key, depth) to extract the quadrant in range 0.3 from some depth in the point key. For example, if a point key thisKey has value Q0323012032021131, GetQuadrant(thisKey, 1) is 0, GetQuadrant(thisKey, 2) is 3, . . . , GetQuadrant(thisKey, 16) is 1.

When processing begins, processing logic moves through thisKey from depth 1 through 16. At each depth, processing logic obtains the quadrant and increments nChildPoints for the Node at the relevant depth and quadrant. This will be illustrated in greater detail with respect to FIG. 14 below. Once this is done, processing logic checks to determine if the quadrant at this depth for thisKey varies from that of lastKey. This is known as the divergence quad. When this divergence quad is reached, its depth is stored and processing breaks out of the loop.

At this point, no more points from the input set will occupy the subtree defined by lastKey truncated to the divergence depth plus one. That is, the child node for lastKey is a sibling of the child node for thisKey at the divergence depth, and the depth-first traversal of the quadtree guarantees no more entries on this branch of the quadtree. Having diverged from this subtree, all relevant quad keys for the subtree may be written.

Moving from the maximum depth up to the top of the subtree, processing logic examines the Node to see if its children must be written. In one embodiment, a child should be examined if (i) the total number of points in the parent node exceeds the threshold or (ii) the parent has reached minimum quad key length. A child node is written if it contains at least one point and has no descendants which have been written. In such a case, the quad key corresponding to the child is written to output (written into the database), with the hasSplitDescendant field being set to TRUE. This process continues to the top of the subtree. In this embodiment, since a parent node contains as many or more points as a child, this process guarantees that all occupied quad keys in the subtree will be written along the way. Of course, it is possible that the entire subtree contains less points than the threshold (and has greater depth than the minimum), so no quad keys will be written. In that case, the information is "pushed up" and a lower-depth quad key (divergence level or closer to the root) will be written later, in another point key's subtree reconciliation process.

After the last point key has been processed in this way, an "artificial divergence" is created to flush the final quad keys. This can be accomplished with any suitable sentinel value for thisKey, which causes the node incrementing step to be skipped and the subtree reconciliation step to occur with the subtree starting at the root.

Figure 15:
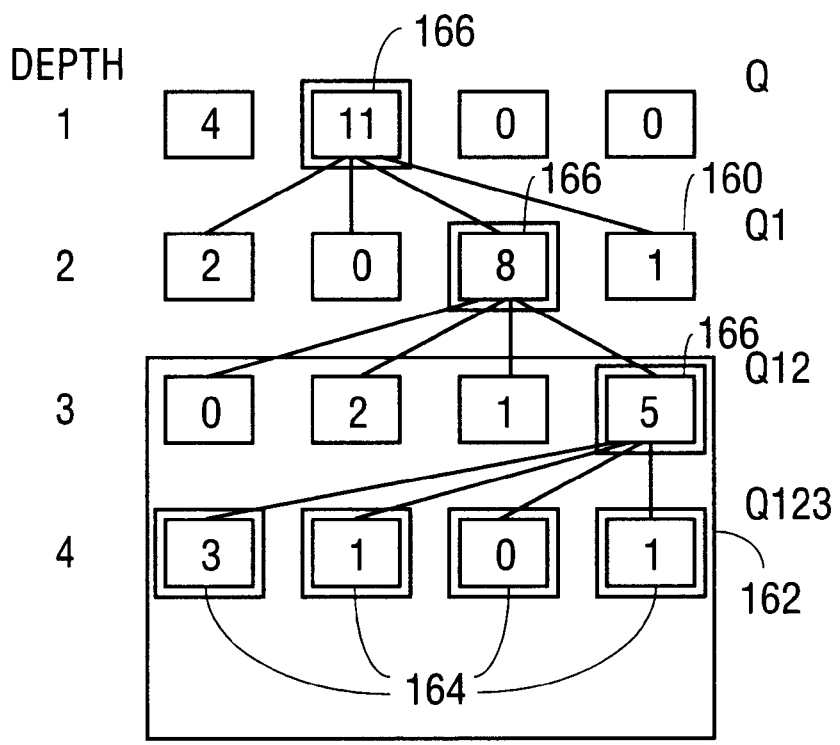
FIG. 15 is a diagram of an intermediate state of indexing the quad tree of FIG. 14.

An example of the foregoing is useful for clarity. FIG. 15 is a diagram of an intermediate state of indexing the quad tree of FIG. 14. In this diagram, the 15th point is being processed currently. Only the first four out of 16 Nodes are shown, for simplicity. The values in each box represent the number of points in that child, from quadrant 0 to the left to quadrant 3 on the right. The Nodes in the array reflect those occupied by the last point key scanned. In this case, it was the 14th point, with point key value Q1233. Prior to this point, no quad keys have been written, because there has never been a case where the total points in the Node at depth one greater than the divergence node has had more than "threshold" (4) points in it. For example, when point 5 was processed, the divergence occurred at depth 1, and the subtree reconciliation proceeded from depth 16 to depth 2. But nowhere along the way was the total number of points in the Node greater than 4, so no quad keys were written.

When point 15 is added, the divergence occurs at depth 2 in quad 160. During subtree reconciliation, a scan is made from depth 16 up to depth 3. This is indicated by box 162 in FIG. 4. For the first time, at depth 4, the total points (5) exceeds the threshold. The quad keys are written for the children in this Node which have at least one point and no descendants that have been written. This includes the quad keys in the 0, 1, and 3 position. Therefore, Q1230, Q1231, and Q1233 are written. As this is performed, each child 164 is set and its ancestor 166 Nodes' hasSplitDescendant field is set to TRUE. The subtree reconciliation then moves up to depth 3. Since (by definition) this Node also has more points than the split threshold, processing logic writes each quad key that has at least one point and where hasSplitDescendant is FALSE. This causes Q121 and Q122 to be written but not Q123, which has already been split. At this point, the subtree has been fully reconciled. That is, all the points within quad Q12 have been examined and all the quad keys written. Thus as we diverge to Q13, it is safe to reset nChildPoints to zero and hasSplitDescendant to FALSE for all Nodes of depth 3 and greater. These subtree nodes now reflect the path through the tree of the new point, and nChildPoints is set to one in all relevant children to represent that point.

This process writes only populated quad keys and none of them overlap. Accordingly, efficient indexing without post-processing is accomplished. Once the personal database is organized into a quadtree and indexed, efficient proximity searching may be conducted on the personal database. This feature is useful in many contexts. For example, if the personal database contains an address book, and the user is going to be in e.g., Chicago, a proximity search of the database based on the address of the user's hotel may reveal a list of friends that live nearby. If the database contains recommended restaurants, a listing of nearby restaurants may be generated.

Address Information Extraction

In one embodiment, address extractor 20 extracts addresses or address information using a program that locates addresses in data. The following describes the operation of one such program. Such programming may be implemented in hardwired logic to perform the same, if not identical functionality. Other address extraction implementations may be used.

For each record in a given set of records for which it is desired to find address information, the following processing operations are performed. The process is based on locating a clearly recognizable anchor (e.g., zip code, postal code, etc.) and examining text on both sides of that anchor to ascertain other portions of the address. It should be noted that although the process is described below with reference to a zip code, a postal code or any other anchor may be used instead.

The process begins by first translating formatting tags into a simpler set of characters. This is an optional operation. These formatting tags are specific patterns that occur in the record and may be translated to a new set of output patterns. The purpose of this translation is to normalize the set of tokens and delimiters that address extractor 20 needs to recognize. For example, HTML uses specific formatting tags to direct the appearance of text or formatted pages. Translating the wide variety of formatting tags into a smaller set of modified tags or characters significantly reduces the coding complexity and execution overhead of address extractor 20.

Next, the address extraction located a zip code in the record. Address extractor 20 scans the data in the record for a token that looks like a zip code. Any such tokens identified are referred to herein as a potential zip code. In one embodiment, a potential zip code is a token in the form of "ddddd" or "ddddd-dddd", where d represents a digit. A potential zip code is delimited by some set of characters deemed to represent a boundary between adjacent tokens. This set of characters may vary.

For each potential zip code, address extractor 20 records both the position in the record adjacent to and after the end of the potential zip code and the position in the record adjacent to and before the start of the potential zip code.

Whenever a potential zip code is located (or after all potential zip codes in the record have been located) for a string of a certain number of characters adjacent and to the left of the start of the potential zip code, address extractor 20 splits the characters in the string into a set of tokens and delimiters between the tokens.

After locating a zip code, address extractor 20 locates a state. In one embodiment, address extractor 20 determines whether the token or tokens adjacent and to the left of the potential zip code represent a state. In one embodiment, to perform this function, address extractor 20 uses an auxiliary table to compare the parsed token to a set of tokens that either represent a state name or a portion of a state name. If a token is a portion of state name, address extractor 20 examines the previous token to determine whether the pair of tokens taken together represent a valid state name. Based on the delimiter between two partial state name tokens, address extractor 20 may determine that the two tokens probably do not represent an integral unit that represents a state name. The set of delimiters so defined may be variable, and can be empty.

In one embodiment, once a potential state name has been identified, address extractor 20 may determine whether the potential state and potential zip code comprise a valid state and zip code combination. In one embodiment, address extractor 20 uses an auxiliary table to perform this check. If the combination is valid, there is a high degree of certainty that the portion of the record being examined represents at least a partial address.

Based on a set of conditions, address extractor 20 sets a confidence factor to a value that indicates the likelihood that the assembled token or tokens represent a state name. In one embodiment, the conditions can include, for example, whether the potential zip code and potential state tokens comprise a valid combination and what the delimiters before and after the potential state tokens are.

Note that the use of a confidence factor may not be necessary; however, the confidence factor may give greater certainty to the search results that are obtained from search, particularly where address extractor 20 finds multiple potential zip codes in a record and a determination must be made as to which of the potential zip codes is part of the address (or addresses) that will be extracted from the record.

Although the operation of address extractor 20 described above is limited to identifying states and zip codes within tokens and delimiters, address extractor 20 may also scan for other address related information, such as cities and street addresses.

In one embodiment, to determine a city name, address extractor 20 examines the tokens and delimiters that precede the state name to find a boundary condition that likely indicates a set of tokens that indicates the city name has been found. One example set of boundary conditions might include:

1. the presence of a delimiter, such as a comma, that separates one or more tokens from preceding text.
2. the presence of a token that is very likely not part of a city name, such as a number, or the token "Street" (or other similarly descriptive token). An auxiliary table may be used to identify the set of tokens explicitly excluded from inclusion as part of a city name.
3. Some maximal number of tokens. City names are rarely composed of more than three words, and in the absence of a stronger boundary condition, it might be necessary to choose some maximum number of tokens to represent the city.
4. Optionally, potential city name tokens can be checked against an auxiliary city name to state/zip code translation table to check the accuracy of the extracted city name. The use of an auxiliary table is particularly useful in the absence of a starting delimiter. For example, it is possible that the last token of the street address could also be the first token of the city name. A token such as "North" could be a postdirectional that appears at the end of the street address, or the beginning of the city name.

One embodiment of the process performed by address extractor 20 to locate a street address is as follows. Locating a street address, often called the A2 line, is more complicated than locating zip codes, state names and city names because the A2 line may contain a wider range of formats and tokens. In one embodiment, the process of identifying a street address is broken into two steps: classifying text and checking the classified text against address patterns.

First, address extractor 20 classifies a given number of tokens and intervening delimiters to the left of the city name. Rarely does an A2 line contain more than seven or eight discrete tokens, so it is unnecessary to examine more than this number of tokens. One possible token classification scheme might include the following types: street suffix; digits; directional (North, South, East, West, Northeast, Northwest, Southeast, Southwest and abbreviations); rural route or post office box components (e.g., PO Box, RR, HC, or HCR); secondary unit designators, such as Suite or Floor; mixed alphanumeric; special street names, such as Broadway; unclassified.

Address extractor 20 also classifies the delimiters between the tokens because it is important to differentiate between word delimiters (typically one or more spaces) and stronger delimiters, such as commas and newline characters. Some delimiters, such as hyphens, can be part of the address.

As part of token delimiter classification, address extractor 20 maintains information about the occurrence of token types within the text that is examined to locate the A2 line. For example, the position (relative to other tokens and delimiters) of the rightmost street suffix, leftmost number, and leftmost strong delimiter, among others, are used in the pattern matching phase.

Once the A2 tokens are classified, address extractor 20 compares them against possible A2 patterns. If fast execution time is a requirement, pattern tests should be executed such that early patterns are both common and computationally cheap. Patterns that successfully match potential A2 lines have a filtering effect, obviating the need to execute subsequent pattern checks. Likewise, it is best to defer checking expensive patterns until more straightforward patterns have been able to reduce the number of potential A2 lines executed against the expensive patterns.

In order to give the flavor of how A2 patterns are used, several patterns are described below. The list is not meant to be complete. In the examples below, "strong delimiter" refers to a delimiter that often acts as a separator between logical units of text. Because users don't always use standardized formats when writing addresses, and because formatting languages (such as HTML) often cause formatted text to appear differently than the source text used to specify the formatting, it may not be possible to assign an unambiguous meaning to a specific delimiter. Nevertheless, some delimiters frequently represent a logical partitioning of the text surrounding it. Below, tokens and delimiters are separated from adjacent tokens and delimiters by the "|" character. "DNC" means "do not care".

For example, the pattern:

strong delimiter|number|DNC|street suffix.

An example of this pattern is: 36 Elm Street

Another common pattern is as follows:

strong delimiter|one or more tokens|street suffix

This pattern, a common one, may be expressed procedurally. First, address extractor 20 finding the rightmost street suffix. Then, address extractor 20 moves left until a token that is not a street suffix is encountered (some street addresses have two adjacent street suffixes). Address extractor 20 moves left until a token that is a number is encountered. If there are number tokens to the left of this number token, address extractor 20 determines if they are part of the address. In one embodiment, address extractor 20 determines this by checking the delimiter to the left of this number. It may be necessary to check for additional number tokens to find the complete address if the street number is hyphenated, fractional, or if it has an embedded period. Consider an address of the form "2334 4th Street", which is sometimes expressed as "2334 4 Street." The pattern described here will match addresses of this form. Also note that this pattern could be used to match addresses matched by the first pattern. Since the first pattern is both common and computationally cheaper than the current pattern, if both patterns are used, by applying the first pattern before this pattern, some efficiency is gained.

In one embodiment, the extraction of address information from a document is made easier through the use of special tags that indicate to address extractor 20 that address information follows. For instance, "geotags" are metadata that may be used in web pages and other documents to specify an address or other geographical data (initially points; eventually, perhaps, lines and regions as well). The address may comprise one or more coordinate values, such as, for example, the latitude and longitude values. That is, the tag or tags are used to indicate a longitude and/or a latitude follows.

In an alternate embodiment, address extractor 20 may extract other information from the record that may be indicative of address information. For example, in one embodiment, address extractor 20 may extract a telephone number. Then a table storing address information for that telephone number, or portion thereof (e.g., area code), may be accessed to obtain the address information. The address information in the table could be a zip code and/or state or may be coordinate values (e.g., latitude and longitude). In another embodiment, the table may specify point or area keys. Again, the extraction of the information from the document may be based on the tokens, delimiters and/or tags used the document.

Once a potential address is found it needs to be geocoded. Geocoding refers to the process of assigning a latitude and longitude to the address. In one embodiment, a confidence factor is assigned to each address component as the address is extracted. If the geocoding process indicates that it was able to assign a precise point in two-dimensional space to the address, geocoding for the address is finished. If the geocoding process indicates that there is room for improvement, one might optionally decide to do further processing in hopes of improving the geocoding accuracy. By examining the confidence factors associated with different parts of the address, it can be determined where additional effort might profitably be spent in hopes of improving the geocoding results.

In one embodiment, a map, or portion thereof, is displayed once an address has been obtained and geocoded. This map may act as a visual confirmation to the user of the address location extracted by address extractor 20.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

We claim:

1. A system for creating a database that may be spatially searched, the system comprising:

a database manager to receive data from a network and process the data into a series of records for the database;

a spatial indexer to recognize address information in the data and generate spatial indices for records based on the address information to associate a geographic location with each of the records; and a storage to store the data with the spatial indices in a form accessible over the network that permits spatial searching.

2. The system defined in claim 1 wherein the database manager analyzes the format of the data and maintains the format in the storage.

3. The system defined in claim 1 wherein the spatial indexer comprises:

an address extractor to extract the address information from the data; and a geocoder to geocode the address information.

4. The system defined in claim 1 further comprising a map generator to generate a map illustrating a location associated with a selected record.

5. The system defined in claim 4 wherein the spatial indexer updates the spatial index for the selected record in response to an individual repositioning the location on the map.

6. The system defined in claim 1 wherein data may be accessed from the World Wide Web for inclusion in the database and the database may be accessed via the World Wide Web.

7. The system defined in claim 1 further comprising a password security module to provide multiple privilege levels to access the database.

8. The system of claim 1 wherein the database manager scans for an e-mail address and a web page address and makes a hot link of each of the e-mail and the web page addresses if found.

9. The system of claim 1 further comprising:

a metatable to store a metadata corresponding to the layout of the data in the database.

10. The system of claim 1 wherein the database manager associates a map with an entry of the database if an address is successfully extracted and geocoded.

11. A method comprising:

accepting data of unknown format from a remote source;

identifying if address information is present in the data;

geocoding the address information if identified; and accumulating the data and any geocoded address information into a database sharable over a widely accessible computer network.

12. The method of claim 11 further comprising:

permitting a user to supply a preference for presentation of the database; and maintaining an association between a database name and the preference supplied.

13. The method of claim 12 further comprising:

dynamically generating a web page containing information from the database display consistent with the preference and the data in the database.

14. The method of claim 11 further comprising establishing a confidence factor for the geocoding.

15. The method of claim 14 further comprising associating a map with a record containing geocoded address information if the confidence factor reaches a predetermined level.

16. The method of claim 14 further comprising:

permitting a user to reposition an icon corresponding to the address information on the map; and adjusting the geocoding responsive to repositioning of the icon.

17. The method of claim 11 wherein accepting data comprises creating a data structure having a field corresponding to each field in an imported record.

\* \* \* \* \*